United States Patent [19]
Malik

[11] Patent Number: 6,157,168
[45] Date of Patent: Dec. 5, 2000

[54] SECONDARY POWER SUPPLY FOR AN UNINTERRUPTIBLE POWER SYSTEM

[75] Inventor: Randhir S. Malik, Cary, N.C.

[73] Assignee: International Business Machines Corporation, Armonk, N.Y.

[21] Appl. No.: 09/429,797

[22] Filed: Oct. 29, 1999

[51] Int. Cl.[7] .......................... H01M 10/44; H01M 10/46
[52] U.S. Cl. .............................. 320/128; 307/66
[58] Field of Search .................... 320/127, 128, 320/117, 121, 140, 138; 307/19, 46, 48, 64, 65, 66

[56] References Cited

U.S. PATENT DOCUMENTS

| | | | |
|---|---|---|---|
| 4,200,830 | 4/1980 | Oughton et al. | 320/32 |
| 4,258,304 | 3/1981 | Bourke | 320/2 |
| 4,366,390 | 12/1982 | Rathmann | 307/66 |
| 4,607,208 | 8/1986 | Vreeland | 320/21 |
| 4,827,151 | 5/1989 | Okado | 307/66 |
| 5,126,585 | 6/1992 | Boys John T. | 307/66 |
| 5,247,205 | 9/1993 | Mototani et al. | 307/66 |
| 5,581,171 | 12/1996 | Kerfoot et al. | 320/50 |
| 5,689,412 | 11/1997 | Chen | 363/125 |
| 5,764,030 | 6/1998 | Gaza | 320/116 |
| 5,773,963 | 6/1998 | Blanc et al. | 320/145 |
| 5,909,360 | 6/1999 | Lavin et al. | 363/21 |

OTHER PUBLICATIONS

"Personal Computer System Smartswitch Battery Backup Controller", IBM Technical Disclosure Bulletin, vol. 32, No. 5B, Oct. 1989, p. 70–71.

"Uninterruptable Power Source", Chorpenning, JS, http://infogate.ibm.com, Jul. 14, 1999 3:06pm, p. 1 of 2.

*Primary Examiner*—Edward H. Tso
*Attorney, Agent, or Firm*—Bernard D. Bogdon; Andrew Dillon

[57] ABSTRACT

A secondary power supply with a battery charging circuit for use with a primary power supply having an AC power relay coupled to a AC power source and a DC/DC power converter is disclosed. The secondary power supply includes a battery bank having positive and negative terminals, wherein the negative terminal is coupled to a negative power rail of the primary power supply. An auxiliary switch in the AC power relay, having first and second contacts coupled to the positive terminal of the battery bank and a positive power rail of the primary power supply, respectively, is closed in response to a loss of the AC power source. A battery charger circuit, coupled to the auxiliary switch and the battery bank, utilizes a voltage output from the DC/DC power converter to regulate charging of the battery bank. The battery charger circuit, in one embodiment, includes a regulation circuit that senses a plurality of electrical characteristics of the battery bank and, in response thereto, generates a control signal. Next, a drive circuit, coupled to the regulation circuit, receives the control signal and, in response thereto, selectively couples the battery bank to a DC power rail of the power supply.

23 Claims, 5 Drawing Sheets

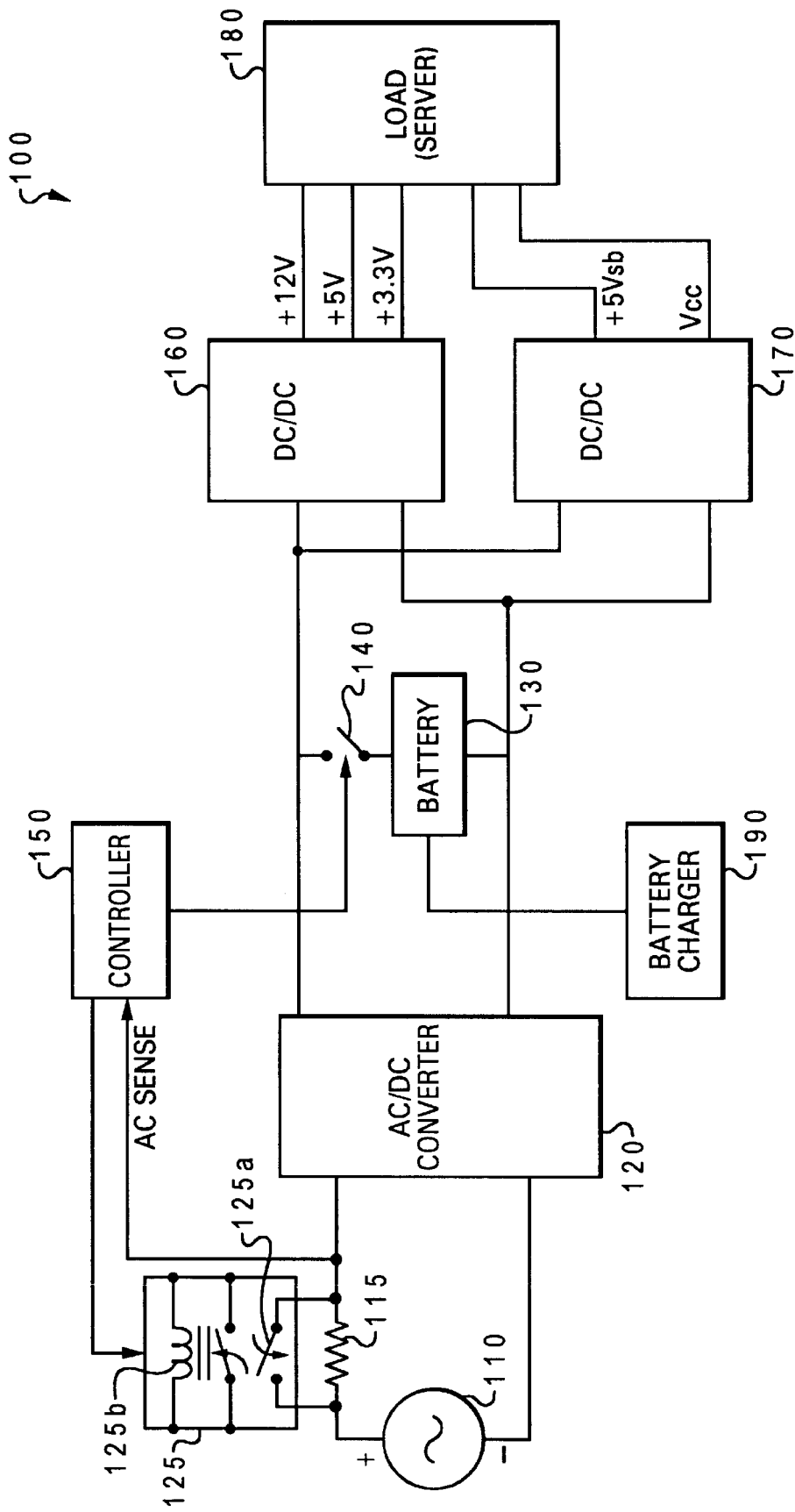
Fig. 1 *Prior Art*

SECONDARY POWER SUPPLY FOR AN UNINTERRUPTIBLE POWER SYSTEM

BACKGROUND OF THE INVENTION

1. Technical Field

The present invention relates generally to power conversion and in particular to uninterruptible power supplies (UPSs). Still more particularly, the present invention relates to a secondary power supply with a battery charging circuit for providing an uninterruptible power system and a method of operation thereof.

2. Description of the Related Art

Uninterruptible power supplies are required for many applications where the loss of a primary power source has serious implications. For example, where computer systems are utilized to transfer large amounts of data over a network, it is essential that a backup, or secondary, power supply is available in the event that the primary power source is lost to prevent the loss of valuable information.

Early uninterruptible power supplies (UPSs) were placed between a standard AC utility outlet and an AC input socket of an electrically powered device. These power supplies typically included an AC to DC power converter for converting a received AC power into DC power to charge a battery and a DC to AC converter for reconverting the DC power back into AC power for supply to the AC input socket of the electrical device. This resulted in considerable duplication of circuitry as an AC to DC power converter was also typically included in an integral power supply of the electrical device.

Current conventional UPS systems typically employ a rectifier to convert an AC input power to DC power that, in turn, is subsequently inputted to a power factor correction stage, such as a DC/DC boost converter, that raises the DC power voltage level prior to providing the raised DC voltage to a plurality of DC/DC converters that may include a switching regulator and a bias regulator. The output voltages generated by the bias regulator are generally utilized by control circuitry within the UPS and the outputs of the switching regulator is typically employed to provide power to any load device that is connected to the UPS. The secondary or backup power source is typically a battery or a battery bank, depending on the application and/or load power requirements. The backup battery is conventionally placed at the input power stage of the DC/DC converters and is electrically coupled to the DC/DC converters with a switching device to provide power in the event of a loss of primary power. The switching device is controlled by a controller that monitors the AC input power. The switching device along with its required control circuitry are part of the cost considerations in the design of the secondary power supplies in UPS systems.

Furthermore, unlike the batteries employed in telecommunication applications, in server and workstation applications, the secondary power source, i.e, batteries, are typically lead acid batteries that need to be charged at a certain controlled rate to prevent heating which reduces the operational life of the batteries. Furthermore, the float voltage of the batteries also needs to be well regulated to ensure that the batteries are properly charged. In conventional UPS systems, the battery is typically charged using a flyback type of rectifier followed by an inverter stage that is used to provide 50/60 Hz power to the power system. This charging scheme is expensive to implement and not cost-effective for low cost non-mission critical applications.

Accordingly, what is needed in the art is an improved uninterruptible power supply. In particular, what is needed in the art is a more cost-effective design implementation for secondary power supplies employed in UPS systems.

SUMMARY OF THE INVENTION

To address the above-discussed deficiencies in the prior art, the present invention provides a secondary power supply with a battery charging circuit for use with a primary power supply having an AC power relay coupled to a AC power source and a DC/DC power converter. The secondary power supply includes a battery bank having positive and negative terminals, wherein the negative terminal is coupled to a negative power rail of the primary power supply. An auxiliary switch in the AC power relay, having first and second contacts coupled to the positive terminal of the battery bank and a positive power rail of the primary power supply, respectively, is closed in response to a loss of the AC power source. A battery charger circuit, coupled to the auxiliary switch and the battery bank, utilizes a voltage output from the DC/DC power converter to regulate charging of the battery bank. The battery charger circuit, in one embodiment, includes a regulation circuit that senses a plurality of electrical characteristics of the battery bank and, in response thereto, generates a control signal. Next, a drive circuit, coupled to the regulation circuit, receives the control signal and, in response thereto, selectively couples the battery bank to a DC power rail of the power supply.

The present invention discloses a secondary power supply that utilizes existing components that are already present in conventional power supplies, such as an AC power relay and bias regulator, to provide a cost-efficient battery backup secondary power supply to implement an uninterruptible power system. The conventional AC power relay typically has a number of switches, a few of which, are unassigned, i.e., not used. The present invention utilizes an unassigned switch that is normally open when AC power is present and closes when AC power is interrupted or lost. Additionally, a battery charging circuit is disclosed that maintains the secondary power supply's power source, i.e., battery bank, utilizing an output of a bias regulator. The battery charging circuit migrates from current mode control to a voltage control mode when the charging current drops below a threshold value.

In one embodiment of the present invention, the regulation circuit includes a pulse width modulator. In a related embodiment, the electrical characteristics sensed by the regulation circuit includes a voltage across and a current through the battery bank. The sensed voltage and current is provided to the pulse width modulator that, in turn, generates a control signal. The control signal, in an advantageous embodiment, is then provided to a drive signal generator that controls the operation of a power switch. The power switch controls the charging of the battery bank by selectively coupling the battery bank to the power rail of the power supply.

In another embodiment of the present invention, the voltage across the battery bank is sensed with a voltage divider network. It should be readily apparent to those skilled in the art that other sensing methodologies to ascertain the voltage across the battery bank may also be advantageously employed. The present invention does not contemplate limiting its practice to any one particular measurement technique.

In yet another embodiment of the present invention, the power switch is a metal-oxide-semiconductor field effect transistor (MOSFET). Alternatively, in other advantageous embodiments, the power switch may be an insulated gate bipolar transistor (IGBT) or a gate turnoff thyristor (GTO).

The foregoing description has outlined, rather broadly, preferred and alternative features of the present invention so that those skilled in the art may better understand the detailed description of the invention that follows. Additional features of the invention will be described hereinafter that form the subject matter of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIG. 1 illustrates an exemplary embodiment of a conventional power supply utilizing a secondary (back-up) power system;

DETAILED DESCRIPTION

Figure 2A:
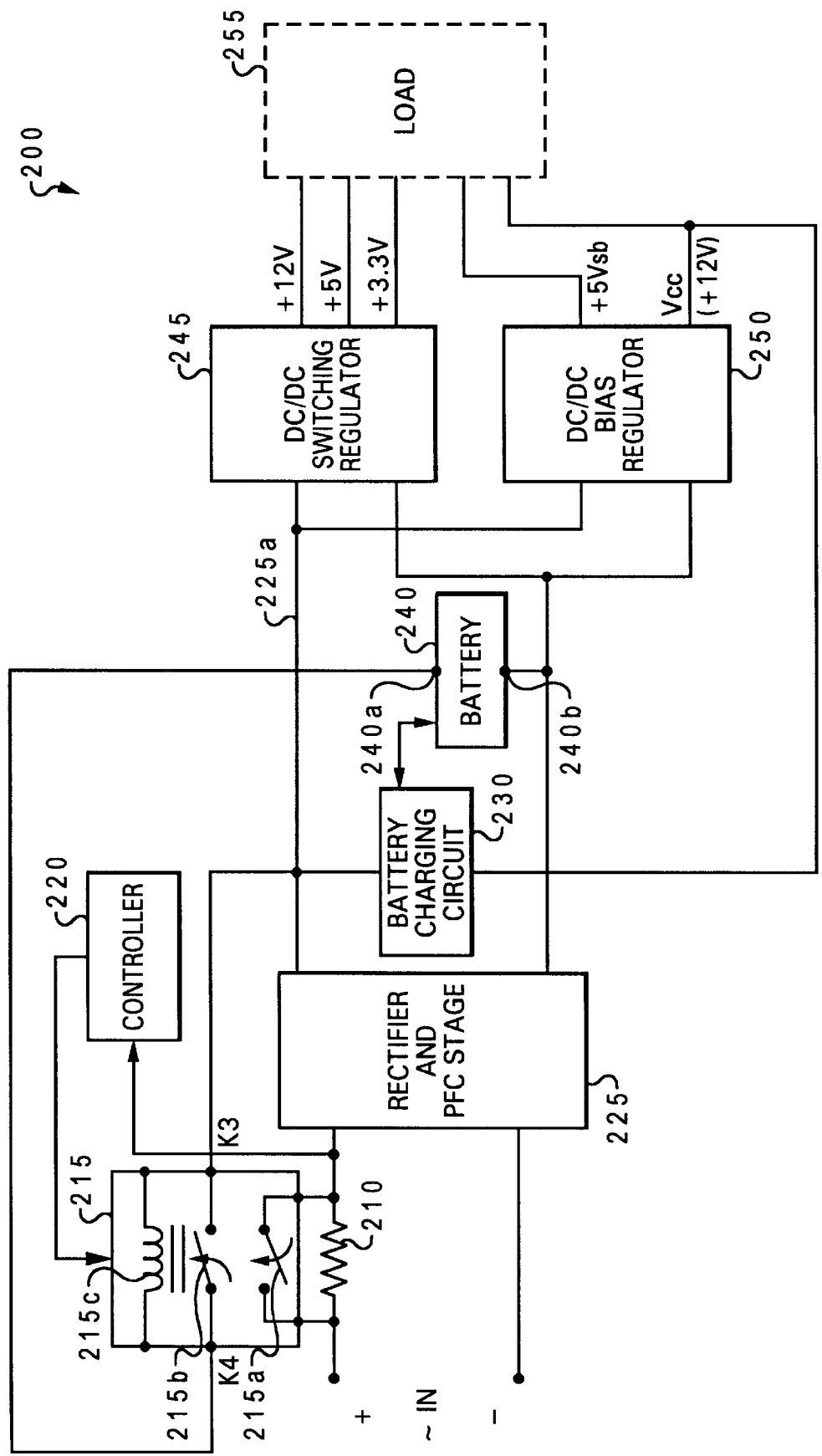
FIG. 2A illustrates an uninterruptible power supply (UPS) employing an embodiment of a secondary power supply constructed according to the principles of the present invention.

With reference now to the figures, and in particular, with reference to FIG. 1, there is depicted an exemplary embodiment of a conventional power supply 100 utilizing a secondary (back-up) power system. Power supply 100 includes an AC/DC converter 120 that typically is comprised of a full-bridge rectifier and a power factor correction (PFC) stage. In the illustrated embodiment, AC/DC converter 120 receives AC input power from an AC power source 110, such as available commercial power. Also shown coupled between AC/DC converter 120 and AC power source 110 is a current limiting resistor 115 that provides a high impedance condition when AC power source 110 is first connected to AC/DC converter 120. Power supply further includes a power relay 125 that has a first switch 125a connected across current limiting resistor 115. First switch 125a is in an open state when AC power is first applied. A controller 150 senses the AC input power and after a short time interval energizes a relay 125b in power relay 125 that, in turn, closes first switch 125a, bypassing current limiting resistor 115 to provide a low impedance condition during normal operation of power supply 100.

The output of AC/DC converter 120 is coupled to a switching regulator 160, typically a DC/DC converter that has multiple output voltage levels, e.g., +12V, +5V and +3.3V, and a bias regulator 170 that is also a DC/DC converter with multiple output voltage levels. The output voltages of switching regulator 160 and bias regulator 170 are provided to a load 180, such as a server in a computer network environment. A battery 130 series coupled with a switch 140 are also shown coupled across the input power rails of switching regulator 160 and bias regulator 170. Switch 140 is controlled by controller 150 to selectively connect battery 150 to the input power rails to provide auxiliary, or back-up, power to the DC/DC converters in the event of a loss of AC input power 110. Battery 130 is maintained utilizing a conventional battery charger 190.

Figure 2B:
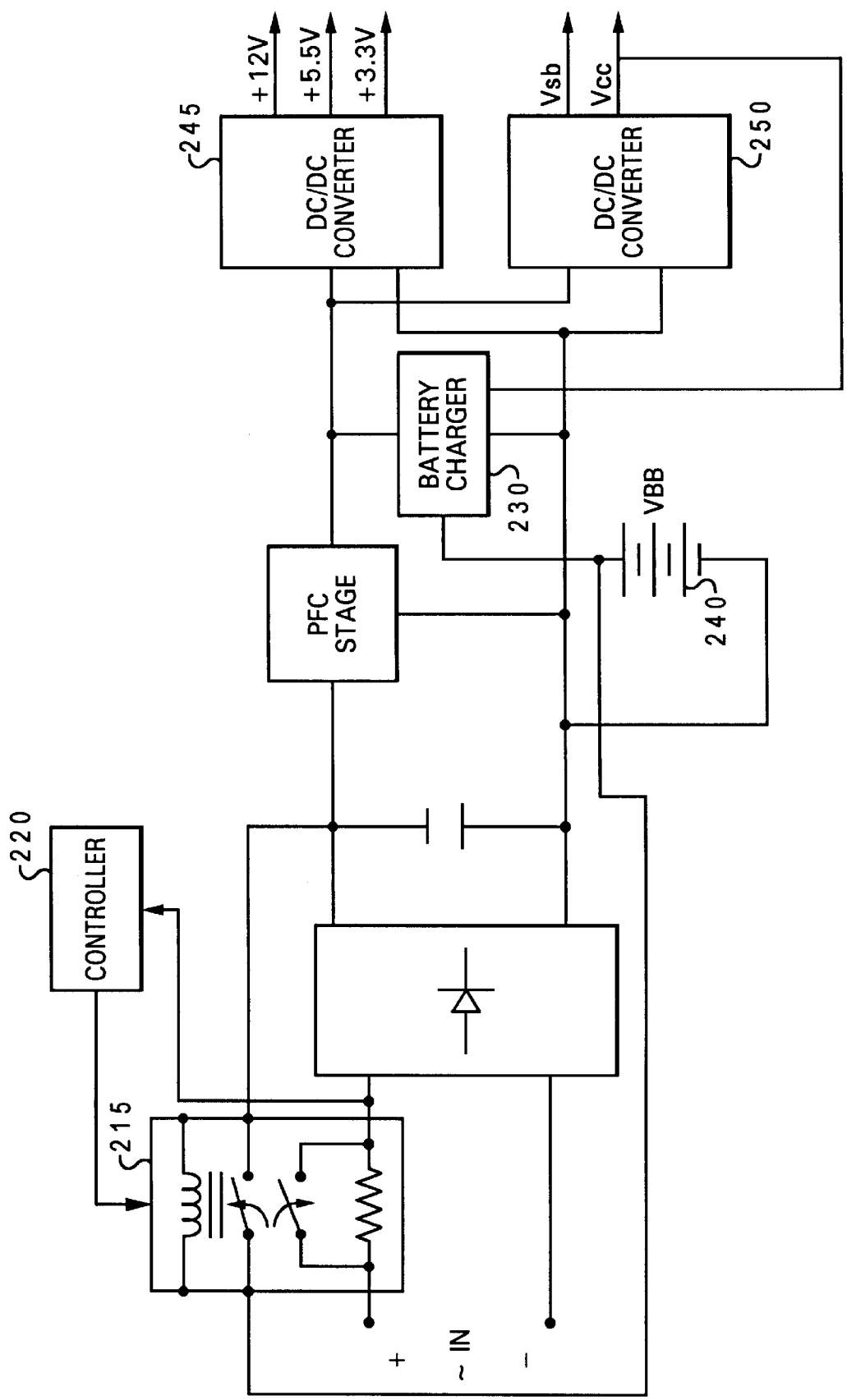
FIG. 2B illustrates an uninterruptible power supply utilizing an embodiment of a secondary power supply wherein a battery bank is located prior to a power factor correction stage (PFC)

Referring now to FIG. 2, there is illustrated an uninterruptible power supply (UPS) 200 employing an embodiment of a secondary power supply constructed according to the principles of the present invention. UPS 200 includes a primary power supply that further includes an AC power relay 215, a current limiting resistor 210, a rectifier 225 having a power factor correction stage, a controller 220, a switching regulator 245 and a bias regulator 250. AC power relay 215 also includes a current limiting switch 215a, an auxiliary switch 215b and a relay 215c. Current limiting switch 215a is connected across current limiting resistor 210 that, in turn, is coupled to an AC input power vin, e.g., commercial power. As described previously, current limiting resistor 210 provides a high impedance mode when input power vin is first applied to UPS 200. After a short time interval, controller 220 energizes relay 215c to close current limiting switch 215a across current limiting resistor 210, to provide a low impedance mode of operation during normal operation of the primary power supply.

Rectifier 225, e.g., a full-bridge rectifier, rectifies AC input voltage vin to a DC voltage and delivers the rectified voltage to a power rail 225a. In an advantageous embodiment, a power factor correction stage, such as boost power converter is employed after rectifier 225 to step up the rectified voltage to a higher voltage level, such as 400V. The rectified power is then provided as input power to a plurality of DC/DC converters, i.e., switching regulator 245 and bias regulator 250 in the illustrated embodiment. Both switching and bias regulators 245, 250 are step down, or buck converters, with multiple outputs that transform the voltage on power rail 225a to voltage levels, e.g., +12V, +5V and +3.3V, that are supplied to a load 255, e.g., a network server. The output voltages of switching regulator 245 are typically employed as primary power sources in load 255, while the output voltages of bias regulator are typically utilized to power the control circuitry (not shown) in load 255.

The present invention recognizes that commonly utilized components, such as an AC power relay, employed in the primary power supply frequently have auxiliary components, e.g., switches, that are not dedicated to any particular function or task. A not used, or unassigned, switch in the power relay is utilized by the present invention to implement a low-cost switching circuit for connecting a secondary power supply, in the event of a loss of AC input power vin, to the plurality of DC/DC power converters.

The secondary power supply includes a battery bank 240 having positive and negative terminals 240a, 240b, respectively. It should be noted that battery bank 240 may include a plurality of batteries or, in another advantageous embodiment, a single battery. The secondary power supply also includes a battery charging circuit 230 that is coupled to battery bank 240 and an output voltage of bias regulator 250. In this manner, battery charger 230 utilizes the bias regulator 250 to regulate the charging of battery bank 240. Battery bank's 240 positive terminal 240a is coupled to a first contact (designated K3) of auxiliary switch 215b. Auxiliary switch's 215b second contact (designated K4) is, in turn, coupled to power rail 225a.

The operation of the secondary power supply in the event of a loss of AC input power vin is relatively straight forward as described hereinafter. During normal operation, i.e., AC input vin present, relay 215c is energized. Consequently, current limiting switch 215a is closed and auxiliary switch 215b is open. With the interruption or loss of AC input power vin, relay 215c becomes de-energized and, in turn, opens current limiting switch 215a. Also, at this time, auxiliary switch 215b is closed, coupling battery bank 240 across the input power rails of switching and bias regulators 245, 250. It should be noted that unlike conventional power backup systems, no additional control circuitry for monitoring the AC input power and/or switching circuitry for connecting the secondary power source to the main power rails are required or necessary. Additionally, if a PFC stage is employed, battery bank 240 may be connected before or after the PFC stage. Although the illustrated embodiment depicts a connection after the PFC stage, in another advantageous embodiment (depicted in FIG. 2B), battery bank 240 is coupled to the outputs of rectifier 225 before the PFC stage to provide regular voltages for longer periods of time. Following its connection to the input power rails, battery bank 240 becomes the primary source of power for UPS 200 until such time as when AC input power vin is restored or the battery voltage falls below a critical minimum voltage level.

Figure 3:
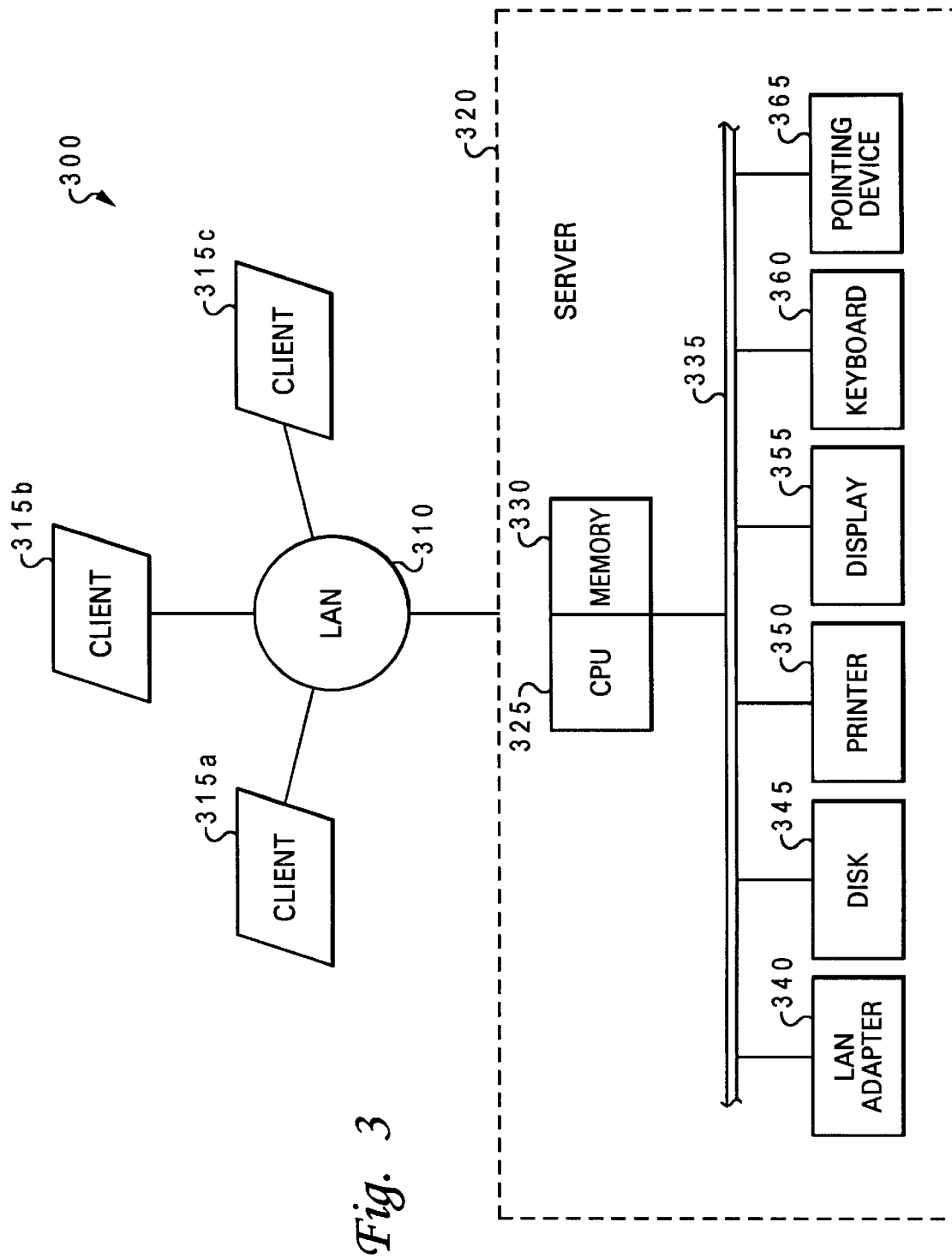
FIG. 3 illustrates a high-level block diagram of an exemplary network enviroment employing an embodiment of a server.

Referring now to FIG. 3, there is illustrated a high-level block diagram of an exemplary network environment 300 employing an embodiment of a server 320. Network 300 generally includes a plurality of clients, generally designated 315a–315c, that is coupled to server 320 (analogous to load 255 depicted in FIG. 2A) via a local area network (LAN) 310. Although network 300 is illustrated utilizing a ring topology, it should be readily apparent to those skilled in the art that network 300 may be implemented using other conventional network topologies and configurations, such as a wide area network (WAN) and intranet. Server 320 includes a central processing unit (CPU) 325 that, as should be apparent to those skilled in the art, may further include multiple CPUs. Server 320 also includes memory 330 that is accessed by CPU 325 to perform computing tasks in a manner well known to those skilled in the art.

In addition to CPU 325 and memory 330, server 320 includes peripheral devices or resources necessary to perform its server functions. These resources include a LAN adapter 340 and a disk device 345. LAN adapter 340 and disk 345 are coupled to CPU 325 and memory 330 by an IO bus 335. It should be noted that, in other advantageous embodiments, server 320 may include multiple LAN adapters 240 and multiple disks 345. Server 320 further includes peripheral devices such as a printer 350, a display 355, a keyboard 360 and a pointer device 365 that are all coupled with CPU 325 and memory 330 via IO bus 335. The plurality of peripheral devices provide a user interface to server 320 which allows it to perform its function as a computer system.

Figure 4:
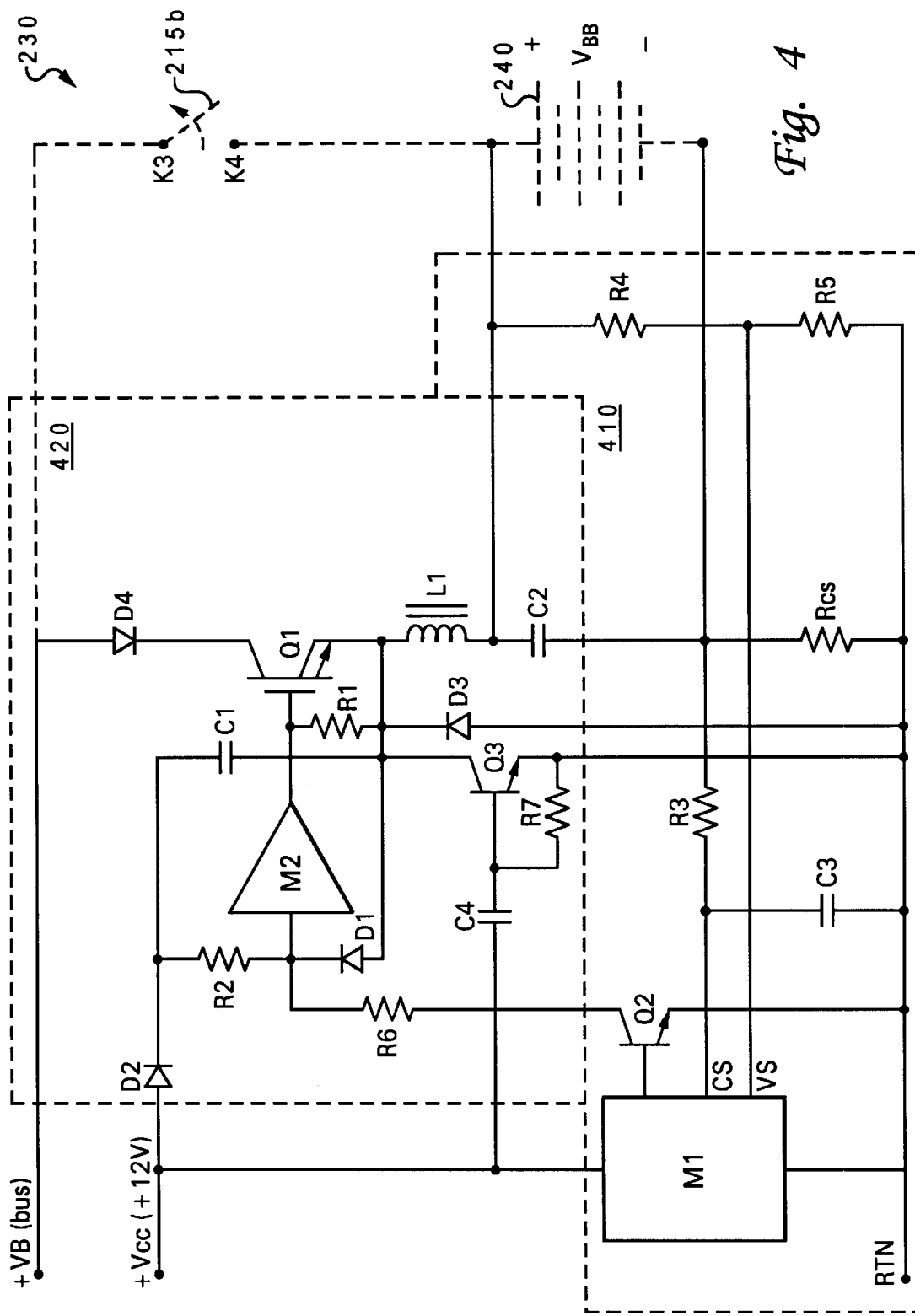
FIG. 4 illustrates a schematic diagram of an embodiment of the battery charging circuit illustrated in FIG. 2 constructed according to the principles disclosed by the present invention.

Referring now to FIG. 4, there is depicted a schematic diagram of an embodiment of the battery charging circuit 230 illustrated in FIG. 2 constructed according to the principles disclosed by the present invention. Battery charging circuit 230 includes a regulation circuit 410 and a drive circuit 420. Regulation circuit 410, as shown in the illustrated embodiment, includes a conventional pulse width modulator M1 that is coupled to a voltage divider network comprised of fourth and fifth resistors R4, R5 that is used to sense a voltage across a plurality of batteries connected in series, i.e., battery bank 240 illustrated in FIG. 2. A current through the plurality of batteries is sensed by pulse width modulator M1 using current sensing resistor Rcs, third resistor R3 and third capacitor C3. A control signal is generated by pulse width modulator M1 by controlling the switching of a second switching device Q2 (a switching transistor is shown).

Drive circuit 420 includes a drive module M2, a conventional inverter logic device may be advantageously utilized, that is coupled to regulation circuit 410 via a sixth resistor R6. The output of drive module M2 is utilized to control the switching of a power switch Q1 that, in an advantageous embodiment, is a metal-oxide-semiconductor field effect transistor (MOSFET). Alternatively, in other advantageous embodiments, power switch Q1 may be an insulated gate bipolar transistor (IGBT) or a gate turnoff thyristor (GTO). Power switch Q1 couples the plurality of batteries to a power rail, e.g., power rail 225a illustrated in FIG. 2, via a fourth diode D4, which provides electrical isolation for the battery charging circuit 230, and an inductor L1.

Drive module M2 utilized to control the switching of power switch Q1 is powered by the voltage developed across a first capacitor C1 that is coupled to a supply voltage Vcc via a second diode D2. Supply voltage Vcc, in an advantageous embodiment, is an output voltage from a DC/DC converter, e.g., bias regulator 250 illustrated in FIG. 2. The voltage across first capacitor C1, during normal operation, is developed by switching power switch Q1 on and off. Initially, the charge in first capacitor C1 is developed by the switching of a third switch Q3 that, in turn, is controlled by a fourth capacitor C4. Third switch Q3 and fourth capacitor C4 are required to charge first capacitor C1 because initially third diode D3 is reversed biased by a battery voltage VBB. Third switch Q3 is turned off once fourth capacitor C4 becomes fully charged. Once first capacitor C1 becomes fully charged, power switch Q1 begins switching, on and off, under the control of pulse width modulator M1. During normal operation when power switch Q1 is off, first capacitor C1 is charged through second diode D2, a first resistor R1 and a third diode D3.

Inductor L1, in combination with a second capacitor C2, is used to average out the pulsating voltage generated by the switching of power switch Q1 under the control of pulse width modulator M1. Third diode D3 provides a return path for the current flowing through inductor L1 when power switch Q1 is turned off and second capacitor C2 acts as a low impedance path for high frequency current flowing through inductor L1.

Initially, when the plurality of batteries are discharged, pulse width modulator M1 operates in a constant current mode to begin charging the batteries. During this mode of operation, the current through the batteries is sensed by current sensing resistor Rcs and integrated by third resistor R3 and third capacitor C3. When the voltage across third capacitor C3 reaches a threshold value Vcs, pulse width modulator M1 generates a control signal that turns off second switch Q2 that, in turn, also turns power switch Q1. When the batteries' voltage reaches a required voltage level, e.g., VBB, the charging will stop. At this time, the switching of power switch Q1 is controlled to prevent the voltage across the batteries from exceeding the floating voltage VBB.

The present invention may be embodied in other specific forms without departing from its spirit or essential characteristics. The described embodiments are to be considered in all respects as illustrative and not restrictive. The scope of the invention is, therefore, indicated by the appended claims rather than by the foregoing description. All changes which come within the meaning and range of equivalency of the claims are to be embraced within their scope.

What is claimed is:

1. A secondary power supply for use with a primary power supply having an AC power relay coupled to an AC power source and a DC/DC power converter, said secondary power supply comprising:

a battery bank having positive and negative terminals, wherein said negative terminal is coupled to a negative power rail of said primary power supply;

an auxiliary switch having first and second contacts coupled to said positive terminal and a positive power rail of said primary power supply, respectively, wherein said auxiliary switch is closed in response to a loss of said AC power source; and a battery charger circuit, coupled to said auxiliary switch and said battery bank, that utilizes a voltage output from said DC/DC power converter to regulate charging of said battery bank.

2. The secondary power supply as recited in claim 1 wherein said auxiliary switch is an auxiliary switch of said AC power relay.

3. The secondary power supply as recited in claim 1 wherein said battery charger circuit includes:
  a regulation circuit that senses a plurality of electrical characteristics of said battery bank and, in response thereto, generates a control signal; and
  a drive circuit, coupled to said regulation circuit, that receives said control signal and, in response thereto, selectively couples said battery bank to a power rail of said power supply.

4. The secondary power supply as recited in claim 3 wherein said regulation circuit includes a pulse width modulator.

5. The secondary power supply as recited in claim 3 wherein said plurality of electrical characteristics include a voltage across and a current through said battery bank.

6. The secondary power supply as recited in claim 5 wherein said voltage across said battery bank is sensed with a voltage divider network.

7. The secondary power supply as recited in claim 3 wherein said drive circuit includes a drive signal generator that controls the operation of a power switch.

8. The secondary power supply as recited in claim 7 wherein said power switch is a metal-oxide-semiconductor field effect transistor (MOSFET).

9. A method for providing secondary back-up power supply to a primary power supply having a DC/DC power converter and an AC power relay coupled to a AC power source; comprising the steps of:
  utilizing an auxiliary switch in said AC power relay, said auxiliary switch having first and second contacts;
  connecting said first contact of said auxiliary switch to a positive terminal of a battery bank;
  connecting said second contact of said auxiliary switch to an input power rail of said primary power supply;
  charging said battery bank with a battery charger that utilizes an output voltage from said DC/DC power converter; and
  closing said auxiliary switch, in response to a loss of said AC power source.

10. The method as recited in claim 9 wherein said step of charging includes the steps of:
  sensing electrical characteristics of said battery bank;
  generating a control signal, in response to said sensed electrical characteristics; and
  providing said control signal to a drive circuit that selectively couples said battery bank to said input power rail.

11. The method as recited in claim 10 wherein said step of providing said control signal further comprises the step of controlling the switching of a power switch.

12. The method as recited in claim 11 wherein said power switch is a metal-oxide-semiconductor field effect transistor (MOSFET).

13. The method as recited in claim 10 wherein said step of sensing electrical characteristics includes the step of sensing a voltage across and a current through said battery bank.

14. The method as recited in claim 10 wherein said step of generating a control signal further includes providing said sensed electrical characteristics to a pulse width modulator.

15. An uninterruptible power supply (UPS), comprising:
  a current limiting resistor coupled to an AC input power source;
  an AC power relay, coupled to said current limiting resistor, having a current limiting resistor bypass switch and an auxiliary switch with first and second contacts, wherein said auxiliary switch is closed in response to a loss of said AC input power source;
  a switching regulator;
  a bias regulator; and
  a secondary power supply, including:
    a battery bank having positive and negative terminals, wherein said positive terminal is coupled to said first contact of said auxiliary switch; and
    a battery charger circuit, coupled to said auxiliary switch and said battery bank, that utilizes a voltage output from said bias regulator to regulate charging of said battery bank.

16. The UPS as recited in claim 15 further comprising a rectifier coupled to said current limiting resistor.

17. The UPS as recited in claim 15 wherein said battery charger circuit includes:
  a regulation circuit that senses a plurality of electrical characteristics of said battery bank and, in response thereto, generates a control signal; and
  a drive circuit, coupled to said regulation circuit, that receives said control signal and, in response thereto, selectively couples said battery bank to a power rail of said power supply.

18. The UPS as recited in claim 17 wherein said regulation circuit includes a pulse width modulator.

19. The UPS as recited in claim 17 wherein said plurality of electrical characteristics include a voltage across and a current through said battery bank.

20. The UPS as recited in claim 17 wherein said drive circuit includes a drive signal generator that controls the operation of a power switch.

21. A server, comprising:
  a central processing unit;
  a memory; and
  an uninterruptible power supply (UPS), including:
    a current limiting resistor coupled to an AC input power source;
    an AC power relay, coupled to said current limiting resistor, having a current limiting resistor bypass switch and an auxiliary switch with first and second contacts, wherein said auxiliary switch is closed in response to a loss of said AC input power source;
    a DC/DC converter; and
    a secondary power supply, comprising:
      a battery bank having positive and negative terminals, wherein said positive terminal is coupled to said first contact of said auxiliary switch; and
      a battery charger circuit, coupled to said auxiliary switch and said battery bank, that utilizes a voltage output from said DC/DC converter to regulate charging of said battery bank.

22. The server as recited in claim 21 further comprising a rectifier coupled to said current limiting resistor.

23. The server as recited in claim 21 wherein said battery charger circuit includes:
  a regulation circuit that senses a plurality of electrical characteristics of said battery bank and, in response thereto, generates a control signal; and
  a drive circuit, coupled to said regulation circuit, that receives said control signal and, in response thereto, selectively couples said battery bank to a power rail of said power supply.

* * * * *